(12) United States Patent
Shinoda et al.

(10) Patent No.: US 9,163,164 B2
(45) Date of Patent: Oct. 20, 2015

(54) SUPPORT FILM FOR TAPE AND TAPE

(71) Applicants: HISAMITSU PHARMACEUTICAL CO., INC., Tosu-shi, Saga (JP); TOPPAN PRINTING CO., LTD., Taiko-ku, Tokyo (JP); MARUTO SANGYO CO., LTD., Ogori-shi, Fukuoka (JP)

(72) Inventors: Tomohiro Shinoda, Tsukuba (JP); Hisaaki Isaji, Tsukuba (JP); Yasunori Takada, Tsukuba (JP); Tsuguki Nishihara, Saitama (JP); Atsushi Matsushima, Kitakatsushika-gun (JP); Chiaki Yoshida, Tatebayashi (JP); Tsuyoshi Takamiya, Ogori (JP)

(73) Assignees: HISAMITSU PHARMACEUTICAL CO., INC., Tosu-shi (JP); TOPPAN PRINTING CO., LTD., Tokyo (JP); MARUTO SANGYO CO., LTD., Ogori-shi (JP)

(*) Notice: Subject to any disclaimer, the term of this patent is extended or adjusted under 35 U.S.C. 154(b) by 0 days.

(21) Appl. No.: 14/339,487

(22) Filed: Jul. 24, 2014

(65) Prior Publication Data
US 2014/0329063 A1    Nov. 6, 2014

Related U.S. Application Data

(63) Continuation of application No. PCT/JP2013/051284, filed on Jan. 23, 2013.

(30) Foreign Application Priority Data

Jan. 27, 2012    (JP) ................................ 2012-015962

(51) Int. Cl.
*B32B 3/02* (2006.01)
*C09J 7/02* (2006.01)
(Continued)

(52) U.S. Cl.
CPC ............... *C09J 7/0282* (2013.01); *B32B 27/40* (2013.01); *C08J 7/04* (2013.01); *C08L 75/04* (2013.01);
(Continued)

(58) Field of Classification Search
CPC .................................. B32B 27/40; C08L 75/04
See application file for complete search history.

(56) References Cited

U.S. PATENT DOCUMENTS

| | | |
|---|---|---|
| 3,549,452 A | 12/1970 | Walsh |
| 4,444,819 A | 4/1984 | Maruta et al. |

(Continued)

FOREIGN PATENT DOCUMENTS

| | | |
|---|---|---|
| CN | 101454416 A | 6/2009 |
| CN | 103097130 A | 5/2013 |

(Continued)

OTHER PUBLICATIONS

International Search Report of PCT/JP2013/051284, dated Apr. 2, 2013. [PCT/ISA/210].

(Continued)

*Primary Examiner* — Elizabeth Mulvaney
(74) *Attorney, Agent, or Firm* — Sughrue Mion, PLLC

(57) ABSTRACT

A support film for tape which is used for a tape includes a film-shaped support formed of polyurethane, a barrier layer which includes polyvinyl alcohol and a layered inorganic compound and is formed on a surface of the support, and an undercoat layer which is disposed between the support and the barrier layer, and which causes the support and the barrier layer to adhere to each other.

6 Claims, 7 Drawing Sheets

(51) Int. Cl.
*C08L 75/04* (2006.01)
*B32B 27/40* (2006.01)
*C08J 7/04* (2006.01)

(52) U.S. Cl.
CPC .......... *C09J 7/0296* (2013.01); *C09J 2429/001* (2013.01); *C09J 2475/006* (2013.01); *Y10T 428/24851* (2015.01); *Y10T 428/2848* (2015.01); *Y10T 428/31551* (2015.04)

(56) References Cited

U.S. PATENT DOCUMENTS

| | | | |
|---|---|---|---|
| 4,875,473 | A | 10/1989 | Alvarez |
| 5,613,958 | A | 3/1997 | Kochinke et al. |
| 5,846,214 | A | 12/1998 | Makuuchi et al. |
| 5,912,204 | A | 6/1999 | Yamada et al. |
| 5,993,961 | A | 11/1999 | Ugolick et al. |
| 7,063,859 | B1 | 6/2006 | Kanios et al. |
| 2002/0055579 | A1 | 5/2002 | Oshita et al. |
| 2005/0196607 | A1 | 9/2005 | Shih et al. |
| 2006/0034905 | A1 | 2/2006 | Singh et al. |
| 2007/0259029 | A1 | 11/2007 | McEntire et al. |
| 2009/0029854 | A1 | 1/2009 | Maruyama et al. |
| 2009/0148640 | A1 | 6/2009 | Yoshida et al. |
| 2013/0144226 | A1 | 6/2013 | Takada et al. |
| 2013/0183522 | A1 | 7/2013 | Takada et al. |
| 2013/0184663 | A1 | 7/2013 | Takada et al. |

FOREIGN PATENT DOCUMENTS

| | | | |
|---|---|---|---|
| CN | 103140351 | A | 6/2013 |
| EP | 0164594 | A2 | 12/1985 |
| GB | 2452086 | A | 2/2009 |
| GB | 2457294 | A | 8/2009 |
| JP | 55-126818 | U | 9/1980 |
| JP | 08-127531 | A | 5/1996 |
| JP | 9-262249 | A | 10/1997 |
| JP | 2003-093434 | A | 4/2003 |
| JP | 2003-136645 | A | 5/2003 |
| JP | 2006-016382 | A | 1/2006 |
| JP | 2008-126631 | A | 6/2008 |
| JP | 2009-173626 | A | 8/2009 |
| JP | 2009-249298 | A | 10/2009 |
| JP | 2009-536647 | A | 10/2009 |
| TW | 200803923 | A | 1/2008 |
| WO | 93/11938 | A1 | 6/1993 |
| WO | 96/08369 | A1 | 3/1996 |
| WO | 00/31201 | A2 | 6/2000 |
| WO | 2005/105060 | A1 | 11/2005 |
| WO | 2007/023791 | A1 | 3/2007 |
| WO | 2009/027648 | A1 | 3/2009 |
| WO | 2012/014585 | A1 | 2/2012 |
| WO | 2012/014587 | A1 | 2/2012 |

OTHER PUBLICATIONS

"Polyvinyl Alcohol", XP002711439, Retrieved from the Internet: URL: http://www.kremer-pigmente.com/media/files_public/67700-67790e.pdf [retrieved on Aug. 19, 2013].
International Search Report issued Sep. 20, 2011 in International Application No. PCT/JP2011/063668.
Extended European Search Report issued Nov. 12, 2013 in European Application No. 11812180.5.
First Office Action issued May 8, 2014 in Chinese Patent Application No. 201180036480.1 with translation.
International Search Report issued Sep. 20, 2011 in International Application No. PCT/JP2011/063656.
Extended European Search Report issued Apr. 17, 2013 in European Patent Application No. 11812178.9.
Office Action issued Mar. 27, 2014 in Chinese Patent Application No. 201180036478.4 with translation of Search Report.
International Search Report issued Aug. 16, 2011 in International Application No. PCT/JP2011/063666.
Extended European Search Report issued Jul. 12, 2013 in European Patent Application No. 11812179.7.
Office Action issued Feb. 20, 2014 in European Patent Application No. 11812179.7.
Office Action issued Dec. 4, 2014 in U.S. Appl. No. 13/812,788.
International Search Report issued Aug. 16, 2011 in International Application No. PCT/JP2011/063684.
Extended European Search Report issued Aug. 29, 2013 in European Patent Application No. 11812182.1.
The First Office Action issued Mar. 20, 2015 in Chinese Patent Application No. 201380006230.2 with translation.
Office Action issued Apr. 8, 2015 in U.S. Appl. No. 13/812,797, filed Mar. 22, 2013 to Takada.
Office Action issued Apr. 17, 2015 in Taiwanese Patent Application No. 100120864 with translation.
Office Action issued Apr. 20, 2015 in U.S. Appl. No. 13/812,751, filed Apr. 5, 2013 to Takada.
Office Action dated Jul. 28, 2015; U.S. Appl. No. 13/812,797, filed Mar. 22, 2013.

M20···20% MODULUS  M100···100% MODULUS

SUPPORT FILM FOR TAPE AND TAPE

CROSS REFERENCE TO RELATED APPLICATIONS

This application is a continuation application based on a PCT Patent Application No. PCT/JP2013/051284, filed Jan. 23, 2013, whose priority is claimed on Japanese Patent Application No. 2012-015962 filed on Jan. 27, 2012, the content of which is hereby incorporated by reference.

BACKGROUND OF THE INVENTION

1. Field of the Invention

The present invention relates to a support film for tape, and particularly a support film for tape having barrier properties, and a tape using the same.

2. Description of Related Art

A tape on which an adhesive layer is formed on one surface of a sheet-shaped or film-shaped support has been widely used for various purposes such as for medical use or industrial use. In addition to adhesive materials, in some cases a plasticizer and the like are combined to the adhesive layer of the tape. Since there is a concern over a negative effect due to adsorption of the plasticizer depending on materials of a support, it is preferable that at least a surface of the support which comes into contact with the adhesive layer have barrier properties.

A gas barrier film disclosed in Patent Document 1 (Japanese Unexamined Patent Application, First Publication No. 2003-136645) has been used as a film material having barrier properties. In this gas barrier film, a barrier coating film is formed by applying a barrier coating material which is obtained by mixing montmorillonite, which is a layered inorganic compound, and a water-soluble polymer compound on one surface of a plastic base film.

A tape is used in a harsh environment to be contacted with or dipped in a liquid in a state of being attached to an object, in some cases. However, since a gas barrier film disclosed in Patent Document 1 is not conceived to be used under an ordinary environment, it is uncertain whether adhesiveness between a support and a barrier coating film is sufficient. If the gas barrier film disclosed in Patent Document 1 is applied to the tape, peel-off between the support and the barrier coating film occurs. As a result, there is a problem in that the tape is not enough to endure harsh environments.

SUMMARY OF THE INVENTION

The present invention has been made to address the aforementioned problems, and has an object to provide a support film for tape and a tape which successfully maintains barrier properties even under harsh environments.

An aspect of the present invention is to provide a support film for tape used for a tape including: a film-shaped support formed of polyurethane, a barrier layer which includes polyvinyl alcohol and a layered inorganic compound and is formed on a surface of the support, and an undercoat layer which is disposed between the support and the barrier layer, and which causes the support and the barrier layer to adhere to each other.

In the aspect of the present invention, it is preferable that a degree of saponification of the polyvinyl alcohol be in a range of equal to or more than 70%.

In addition, in the aspect of the present invention, it is preferable that the layered inorganic compound be montmorillonite.

Further, in the aspect of the present invention, it is preferable that a printing be carried out on the undercoat layer.

An aspect of the present invention is to provide a tape including the support film for tape of the present invention and an adhesive layer which is formed on the barrier layer, the adhesive layer being formed on a face opposite to the support.

According to the support film for tape and the tape of the aspect of the present invention, it is possible to successfully maintain barrier properties even when elongated in order to be attached to an object or after being attached thereto.

DETAILED DESCRIPTION OF THE INVENTION

Hereinafter, a tape of a first embodiment of the present invention will be described referring to FIGS. 1 to 15.

The tape of the first embodiment include a support film for tape (hereinafter, simply referred to as "support film") of the present invention, and the tape can be used as an adhesive tape or the like in various fields such as for industrial use, packaging, protecting, labeling, masking, hygienic materials such as a diaper, medical use such as an adhesive plaster or transdermal patch, make-up, and household use.

In addition, the following are exemplified as representative detailed applications. An adhesive tape for sealing a packaging material is used as a tape for packaging. As the adhesive tape is capable of being elongated, even in a case of applying a force due to shipping or the like in a state of being packaged, the tape is not cut or the packaging material is not damaged. In addition, since it is possible to maintain excellent barrier properties in a state of being elongated, an exterior portion of the tape is not contaminated when shipping or the like. As a medical tape, in a case of attaching to a human body or an animal, it is possible to respond to according to elongation associated with movement of a human body or the like, and unexpected peel-off is hardly generated. In addition, since it is possible to maintain excellent barrier properties in a state where the tape being elongated, it is possible to obtain excellent performances as the tape for medical without leakage of an active ingredient such as a plasticizer or the like, to the external portion of the tape.

Figure 1:
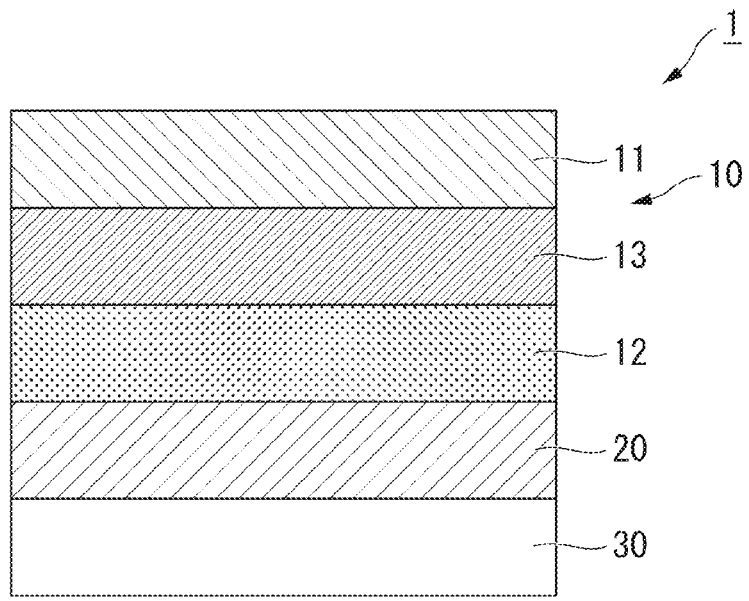
FIG. 1 is a cross-sectional view of a tape of a first embodiment of the present invention in a thickness direction.

FIG. 1 is a cross-sectional view of a tape 1 of the first embodiment in a thickness direction. The tape 1 includes a support film 10, an adhesive layer 20 formed on a surface of the support film 10, and a peel-off member 30 which covers the adhesive layer.

The support film 10 includes a support 11 which includes polyurethane and is formed in a film shape, a barrier layer 12 which is formed on one surface of the support 11, and an undercoat layer 13 which is disposed between the support 11 and the barrier layer 12 and which causes both the support 11 and the barrier layer 12 to adhere to each other.

The support 11 has flexibility and can be elongated by a predetermined maximum elongation rate increasing of the length of the support 11 equal to or more than 10 percent (%). A detailed value of the maximum elongation rate may be suitably set based on the purpose of the tape 1. In the embodiment, the polyurethane which forms the support 11 is not particularly limited, and a material used in a polyurethane film of the related art can be used, and the polyurethane can be suitably selected depending on the purpose. For example, polyether-based polyurethane, polyester-based polyurethane, polycarbonate-based polyurethane or the like may be used. To provide water resistance, polyether-based polyurethane or polycarbonate-based polyurethane is preferable.

In addition, a material configuring the polyurethane is not particularly limited to a type of isocyanate forming a urethane bond, or a material for a yellowing type or a non-yellowing type, and it is suitably selected according to the purpose, storing period or method of usage, types of used plasticizer and the like.

A thickness of the support 11 is 10 micrometers (μm) to 200 μm, and is preferably equal to or more than 20 μm and equal to or less than 100 μm. When the thickness is less than 10 μm, it is difficult to handle as it is too thin, and when the thickness of the support is more than 200 μm, flexibility is reduced such that the original flexibility is not sufficiently exhibited.

The support 11 can include a film called a release film having peel-off properties.

When the thickness of the support 11 is thin, since the support is elongated in a step of applying the barrier layer 12, if manufacturing in a state where the release film and the support (for example, polyurethane as the support) are laminated, it is possible to easily process while suppressing the elongation. In addition, since rigidity of the tape is reinforced by the release film after processing the support 11 on the tape, handle ability of the tape is improved. After the tape is attached to the object, the release film can be peeled from the support, such that the support 11 after peeling off exhibits original flexibility.

The material of the release film is not particularly limited; however, generally, a material which can be peeled off without performing elongation or contraction, such as a silicone-treated PET film, a polyolefin film having excellent peel-off properties, a laminate such as paper or polyethylene, or the like can be used.

The barrier layer 12 is formed to include montmorillonite, which is a layered inorganic compound, and polyvinyl alcohol (PVA), which is a water-soluble polymer compound.

Mineralogically, montmorillonite is a dioctahedral type water-bearing layered silicate mineral and is ideally expressed by the following equation.

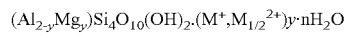

$$(Al_{2-y}Mg_y)Si_4O_{10}(OH)_2 \cdot (M^+, M_{1/2}^{2+})y \cdot nH_2O$$

Herein, y=0.2 to 0.6, M: exchangeable cation such as Na, K, Ca, Mg, or H, n: amount of interlayer water.

A crystal structure of montmorillonite forms a layered structure which includes three layers formed of two tetrahedral sheets and one octahedral sheet as a base. A cation of the tetrahedral sheets is only Si, and part of Al which is a cation of the octahedral sheet is substituted for Mg. Accordingly, a unit crystal layer takes on a negative electric charge, and cations such as $Na^+$, $K^+$, $Ca^{2+}$, $Mg^{2+}$, $H^+$, and the like enter and compensate between crystal layers so as to balance with the negative electric charge of the unit crystal layer. In the present invention, types of the cation can be used with no particular limitations.

The barrier layer 12 can be formed by applying a barrier coating material obtained by adding lower alcohol with a gravure coating method or a roll coating method, after the montmorillonite is added to and dispersed in a water solution obtained by dissolving PVA in water.

A percentage content of the montmorillonite of the barrier layer 12 is in a range of equal to or more than 2 weight percent (wt %) and equal to or less than 22 wt %. A detailed description will be described later; however, if the percentage content is less than 2 wt %, it is difficult to secure sufficient barrier properties. On the other hand, if the percentage content exceeds 22 wt %, an effect caused by the montmorillonite on the properties such as flexibility or elongation of the barrier layer 12 becomes excessive, and as a result, a sufficient response to the shape change of the support due to the elongation cannot be performed, and cracks or the like are easily generated.

The undercoat layer 13 is formed by coating or the like on the surface which is provided with the barrier layer 12 of the support 11. From the viewpoint of enhancing the adhesiveness between the barrier layer and the support, the material of the undercoat layer 13 may be properly determined in view of the material of the support and the barrier layer. For example, if the support 11 is polyurethane, since the physical properties may be reduced such as dissolving in an organic solvent, it is preferable to form an undercoat layer 13 with a water-soluble resin which uses water as a main solvent. If water is used as the main solvent, it is possible to add a small amount of alcohol or the like in order to improve the coating properties.

In the present invention, in addition to a soluble resin, a water-soluble resin also includes a water-dispersible resin such as an emulsion or dispersion. For example, a polymerizable unsaturated carboxylic acid such as a methacrylic acid and an itaconic acid or a polymerizable unsaturated carboxylic acid anhydride thereof; a methacrylic monomer such as methyl methacrylate and ethyl methacrylate and optionally α-methyl styrene; an acrylic resin obtained by copolymerizing vinyl acetate or the like using a polymerization method such as emulsion polymerization, solution polymerization and bulk polymerization and a modified product thereof; and the like can be used as the water-soluble resin with excellent coating properties and adhesiveness. In addition, polyurethane resins, polyester resins, vinyl acetate resins, styrene resins, shellac resins, and polyamide resins which can introduce a hydrophilic component in the molecular structure itself and can select anionic resins, cationic resins, or nonionic resins by selecting the charge from the hydrophilic component; a modified product thereof; and the like can be used as the water-soluble resin with excellent coating properties and adhesiveness. Among the water-soluble resins, the polyurethane resin has excellent flexibility, and is elongated according to the support, so that it is particularly preferable.

Water-based ink which is prepared by adding pigments or additives in the water-soluble resin can be also used as an undercoat layer. When using the water-based ink, the undercoat layer may be formed by whole surface printing with single color ink, and may be formed as an undercoat layer which is printed information such as manufacturers and product identification codes with multiple color ink.

In addition, examples of the water-soluble resin include natural products such as starch and dextrin or compounds such as acrylate and polyethylene oxide, but when the support is formed of urethane-based material, it is difficult to obtain adhesiveness thereof, and thus not preferable.

When forming the undercoat layer by coating with the water-soluble resin, the method is not limited as long as the entire surface is uniformly coated without unevenness. The method such as a roll coating method, a gravure coating method or a die coating method can be used. The coating amount of the water-soluble resin, for example, is preferably 0.1 to 10 g/m$^2$, and particularly preferably 1 to 3 g/m$^2$. When the coating amount is equal to or lower than 0.1 g/m$^2$, there is a negative effect on the adhesiveness and on the uniform coating properties as the undercoat layer, and when the coating amount is equal to or more than 10 g/m$^2$, the undercoat layer becomes hard and thereby causes antagonistic effects on the flexibility of the support and increases the load on the undercoat layer when the layer becomes dry, and therefore is not practical. In order to enhance the adhesiveness of the water-soluble resin, it is possible to perform a pre-treatment such as a corona treatment on the surface of the support.

After forming the undercoat layer 13, the barrier layer 12 is formed. When the barrier layer 12 is formed by coating, the coating amount is preferably 0.1 to 10 g/m$^2$ and particularly preferably 0.5 to 3 g/m$^2$.

When the tape 1 is used in an environment to be placed in water for a long time in a state of being attached to an object, for example, if adhesiveness of the support 11 and the barrier layer 12 is not sufficient, the support 11 is peeled off from the barrier layer 12 and separated from the adhesive layer 20, in some cases. The PVA is a polymer compound which is obtained by saponification of polyvinyl acetate (alkaline hydrolysis treatment) and includes a hydroxyl group. In the support film 10 of the embodiment, since the situation described above can be prevent while maintaining the excellent adhesiveness of the barrier layer 12 and the support 11 through the undercoat layer 13, even when a degree of saponification of PVA exceeds 95.5%, the adhesiveness between the barrier layer 12 and the support 11 is suitably maintained.

However, if the degree of saponification is less than 70%, the barrier layer 12 becomes easily dissolved in water, and as a result, water resistance of the support film 10 and the tape 1 is degraded. Therefore, when the tape is used for industrial tapes, packaging tapes, protective tapes or the like, it is assumed to be affected by rain outside. In addition, when the tape is used for sanitary materials such as a diaper, medical use such as an adhesive plaster or transdermal patch, make-up, or household use, it is assumed to affect by sweat or water when using water in daily life. Accordingly, in the tape used for the above mentioned, it is preferable that the degree of saponification of PVA be equal to or more than 70%.

The adhesive layer 20 is configured by mixing plasticizer with a base material having adhesive properties and is formed by coating or the like on the barrier layer 12 and a surface opposite to the support 11.

An adhesive used in the adhesive layer 20 is not particularly limited, and a rubber-based polymer such as natural rubber, synthetic isoprene rubber, reclaimed rubber, styrene-butadiene rubber (SBR), styrene-isoprene-styrene block copolymer (SIS), styrene-butadiene-styrene block copolymer (SBS), polyisobutylene, SEBS, SEPS, or the like, acrylic polymers such as a copolymer of (meth)acrylic acid ester containing (meth)acrylic acid ester as a main monomer, silicon-based polymers such as silicone rubber, silicone resin, dimethyl siloxane, diphenyl siloxane, and the like, and various polyvinyl ether-based, polyvinyl ester-based, EVA-based, polyester-based materials can be used.

The plasticizer is not particularly limited, and various plasticizers such as petroleum-based oil (paraffinic process oil, naphthenic process oil, or aromatic process oil), dibasic acid esters (dibutyl phthalate, or dioctyl phthalate), liquid rubbers (polybutene, liquid isoprene, or liquid polyisobutylene), vegetable-based oils (castor oil or tall oil), liquid fatty acid esters (isopropyl myristate, hexyl laurate, diethyl sebacate, or diisopropyl sebacate), triacetin, sorbitan fatty acid esters, sucrose fatty acid esters, glycerin fatty acid esters, and surfactants can be used.

Further, for improving adhesiveness, various tackifiers can be mixed. For example, rosin resins such as rosin, modified rosin, or rosin ester, terpene resins such as terpene resin, aromatic modified terpene resin, hydrogenated terpene resin, or terpene phenol resin, petroleum resin such as aliphatic petroleum resins, aromatic petroleum resins, copolymer petroleum resin, hydrogenated petroleum resin, or DCPD-based petroleum resin, styrene resins, substituted styrene resins, xylene resin, phenol resin, chroman-indene resin or the like can be used.

In addition, depending on the purpose of the tape, antioxidants, fillers, cross-linking agents, ultraviolet absorbers, colorants, flame retardants, conductive agents, foaming agents, or the like may be added.

In the tape 1 of the first embodiment, by suitably setting the percentage content of montmorillonite of the barrier layer 12 in the range described above while considering the types of plasticizers, transition of the plasticizer to the support 11 through the barrier layer 12 is suitably suppressed.

In general, polyurethane configuring the support 11 is easily adsorbed onto the plasticizer, and when absorbing the plasticizer, transformation or the like of the support 11 due to the transition of the plasticizer to the support 11 becomes a problem. However, in the tape 1, not only at the time of non-elongation of the support 11, but even at the time of elongation with the elongation rate of 20% (which indicates an increase of length by 20% after the elongation), the barrier properties of the barrier layer 12 is suitably maintained. As a result, according to the tape 1, not only at the time of storage before the use, but also at the time of being used by being attached to an object, it is possible to suitably prevent the problem due to the plasticizer. In addition, the percentage content of the montmorillonite of the tape 1 can be easily set in detail by a preliminary experiment or the like using the plasticizer to be used. In the tape 1, a relationship between the barrier properties with respect to a part of the plasticizer and the percentage content of montmorillonite will be described later.

The peel-off member 30 is a member to protect an adhesive surface of the adhesive layer 20 until the adhesion to an object, and various types of well-known release paper can be suitably used. In addition, when the tape 1 is rolled up on a core, the peel-off member 30 may not be prepared.

Next, a test and a result thereof performed for evaluating a suitable range of the percentage content of the montmorillonite (hereinafter, referred to as "MN", in some cases) of the barrier layer 12 and a suitable range of the degree of saponification of the PVA will be described.

(Experiment 1 Evaluation of Relationship Between Barrier Property and Percentage Content of MN at the Time of Elongation of Support Film: Evaluation with Swelling of Support as Index)

(1-1 Preparation of Sample)

As a support, a support prepared by polyether-based polyurethane having a thickness of 20 μm was used. A barrier layer was formed by uniformly coating 1.0 g/m² of a barrier coating material which was obtained by mixing MN and PVA (with a degree of saponification of 80%) on one surface of the support. By changing this as a basic configuration, 8 stages of the percentage content of MN of the barrier layer were 1 wt %, 2 wt %, 10 wt %, 18 wt %, 22 wt %, 25 wt %, 30 wt %, and 37 wt %, and 8 types of samples of support films were prepared.

(1-2 Experiment Procedure)

Figure 2:
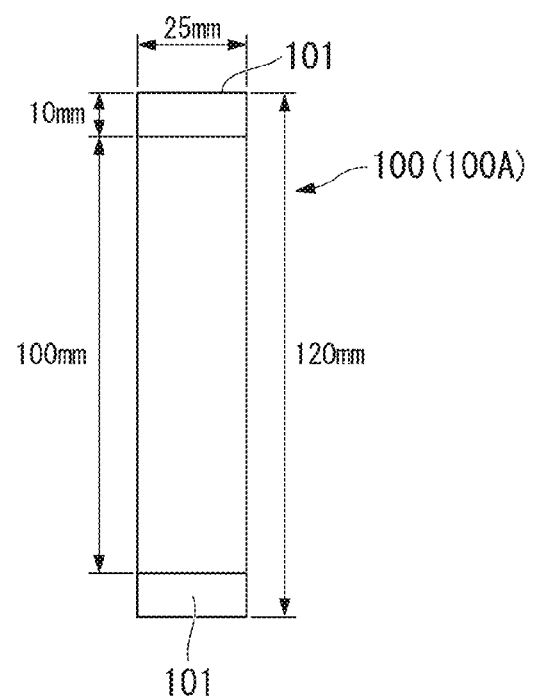
FIG. 2 is a view showing a procedure of an experiment for checking for a suitable range of a percentage content of montmorillonite in a barrier layer.

The prepared 8 types of samples 100 were cut to be a size of 25 millimeters (mm)×120 mm as shown in FIG. 2. According to the cut samples 100, in order to perform easy operation with a tensile tester, a sheet 101 prepared by polyethylene terephthalate (PET) having a thickness of 50 μm was attached to both surfaces of both ends of the cut sample 100 in a longitudinal direction with double-sided tape and an evaluation piece 100A was prepared. A length of a portion on which the evaluation piece 100A was covered with the sheet 101 in the longitudinal direction was 10 mm. In each evaluation piece 100A, a length of a portion which was not covered with the sheet 101 in the longitudinal direction was 100 mm.

Figure 3:
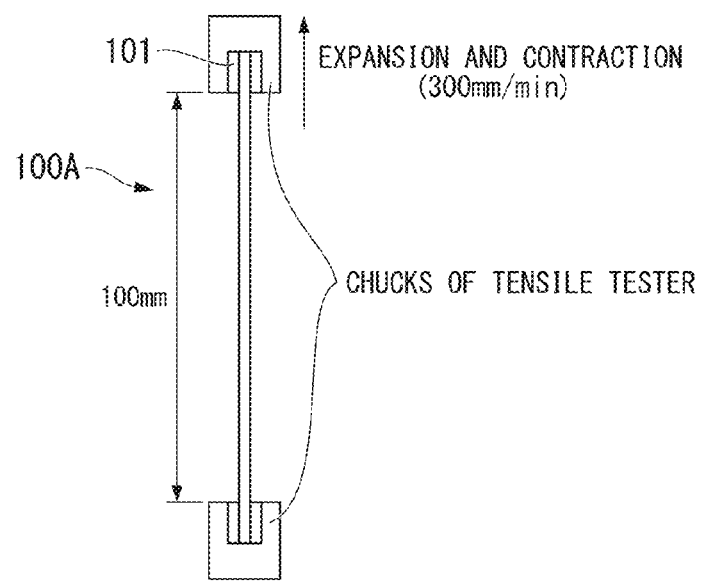
FIG. 3 is a view showing a procedure of the same experiment.

Both ends of the evaluation piece 100A reinforced by the sheet 101 were fixed to the chuck unit of the tensile tester. As shown in FIG. 3, the portion not covered with the sheet 101 was elongated to reach a predetermined elongation rate with an elongation speed of 300 mm per minute (mm/min). Five stages of elongation rate were 0%, 5%, 10%, 20%, and 30%.

Figure 4:
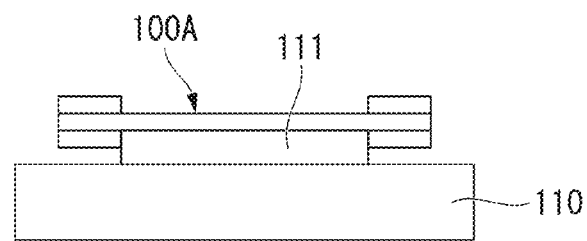
FIG. 4 is a view showing a procedure of the same experiment.

After completing the elongation operation, the evaluation piece 100A was taken off from the tensile tester, and as shown in FIG. 4, each evaluation piece 100A was fixed onto a black acrylic plate 110 obtained by attaching a PET sheet 111 obtained by applying silicone on the surface thereof, with a barrier layer to be on the upper side. At that time, the preparation was performed so that as little air as possible entered between the evaluation piece 100A and the PET sheet 111.

Figure 5:
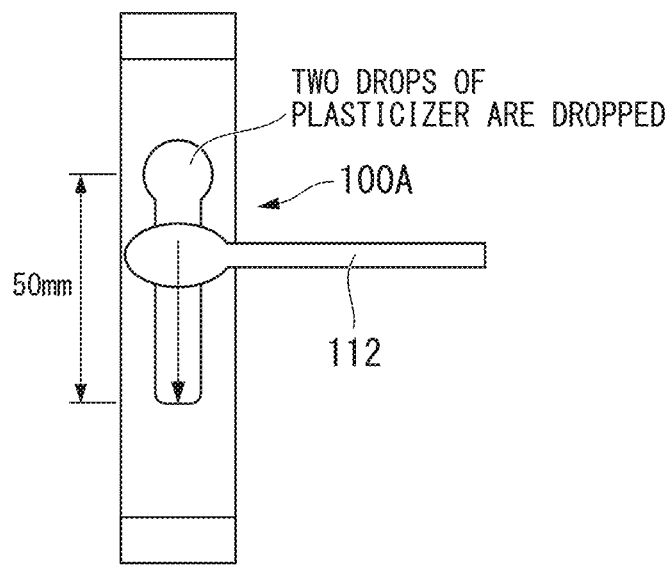
FIG. 5 is a view showing a procedure of the same experiment.
Figure 6:
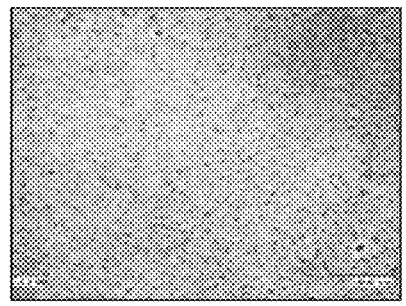
FIG. 6 is an optical micrograph of a barrier layer after performing an elongation operation with an elongation rate of 20% with respect to an evaluated piece with a percentage content of montmorillonite in a barrier layer of 10 wt %.
Figure 7:
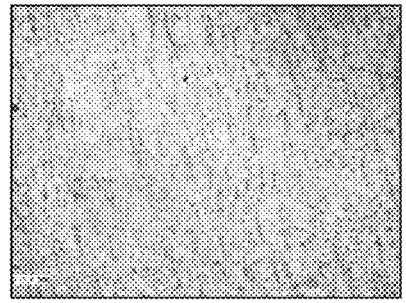
FIG. 7 is an optical micrograph of a barrier layer after performing an elongation operation with an elongation rate of 20% with respect to an evaluated piece with a percentage content of montmorillonite in a barrier layer of 18 wt %.
Figure 8:
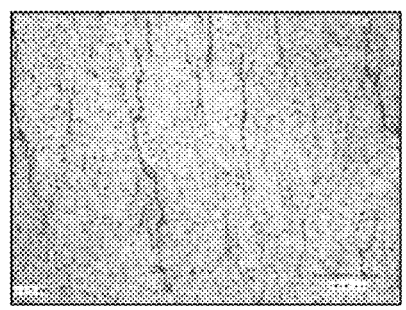
FIG. 8 is an optical micrograph of a barrier layer after performing an elongation operation with an elongation rate of 20% with respect to an evaluated piece with a percentage content of montmorillonite in a barrier layer of 25 wt %.
Figure 9:
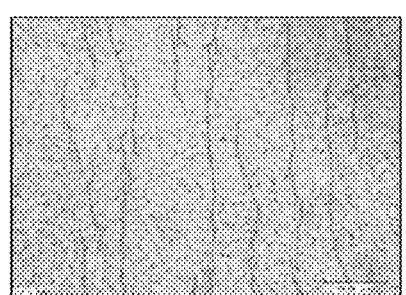
FIG. 9 is an optical micrograph of a barrier layer after performing an elongation operation with an elongation rate of 20% with respect to an evaluated piece with a percentage content of montmorillonite in a barrier layer of 30 wt %.

After attaching the evaluation piece 100A to the acrylic plate 110, as shown in FIG. 5, two drops (approximately 0.08 grams) of plasticizers were deposited on each evaluation piece 100 by a dropper, and the placticizers were expanded to have a length of 50 mm by using a cotton swab 112. As plasticizers, four types of isopropyl myristate (IPM), triacetin (TA), glyceryl monoisostearate (MGIS), and sorbitan monooleate (SMO) were used. After being left for 30 minutes at room temperature, the plasticizers were wiped off and a degree of swelling of the support was visually evaluated. As an index, wrinkles of the support generated due to the swelling were used (two stages of wrinkles due to swelling were not recognized: Excellent, and wrinkles due to swelling were recognized: Poor. In addition, a case where an experiment was not performed was regarded as "None" in Table 1).

The IPM, the TA, and the SMO were evaluated using the evaluation pieces 100A having a percentage content of MN of 1 wt %, 10 wt %, 18 wt %, 22 wt %, 25 wt %, 30 wt %, and 37 wt %, and MGIS was evaluated using the evaluation pieces 100A having a percentage content of MN of 2 wt %, 10 wt %, and 22 wt %.

(1-3 Result)

The result is shown in Table 1. When the percentage content of MN is equal to or less than 22 wt % with the IPM, TA, and MGIS, the swelling of the support with all elongation rates was not recognized, and transition of the plasticizers was suppressed. On the other hand, with the SMO, the swelling was recognized on the support regardless of the percentage content of MN and the elongation rates, and it was considered that the SMO is not preferable as the plasticizer to be used for a film material of the present invention, in some cases. Solubility parameters (SP value based on Fedors method) of each plasticizer used in the experiment were 8.5 for IPM, 10.2 for TA, 10.76 for MGIS, and 11.76 for SMO. When the barrier properties of the support film is considered, it was assumed that the support film using a plasticizer having a low SP value tended to have excellent properties compared to the support film using a plasticizer having a high SP value, in terms of the effect of suppressing the swelling of the support.

FIGS. 6 to 9 are optical micrographs of the support film after performing the elongation operations with an elongation rate of 20% with respect to the evaluated pieces with a percentage content of MN of 10 wt %, 18 wt %, 25 wt %, and 30 wt %. In a case of 10 wt % and 18 wt % of the MN, significant changes on the external portion were not recognized; however, in a case of 25 wt % and 30 wt % of the MN, wrinkles due to the swelling were recognized.

TABLE 1

| Sample configuration | | | Evaluation | | | | | | | | | |
|---|---|---|---|---|---|---|---|---|---|---|---|---|
| | Barrier layer formula | | | | | | | | | | | |
| | Degree of sapon- ification of PVA | Amount of MN | IPM Elongation rate (%) | | | | | TA Elongation rate (%) | | | | |
| Support | % | wt % | 0 | 5 | 10 | 20 | 30 | 0 | 5 | 10 | 20 | 30 |
| Ethers 20 μm | 80 | 1 | Excellent | Excellent | Excellent | Excellent | Excellent | Excellent | Excellent | Excellent | Excellent | Excellent |
| | | 2 | None | None | None | None | None | None | None | None | None | None |
| | | 10 | Excellent | Excellent | Excellent | Excellent | Excellent | Excellent | Excellent | Excellent | Excellent | Excellent |
| | | 18 | Excellent | Excellent | Excellent | Excellent | Excellent | Excellent | Excellent | Excellent | Excellent | Excellent |
| | | 22 | Excellent | Excellent | Excellent | Excellent | Excellent | Excellent | Excellent | Excellent | Excellent | Excellent |

TABLE 1-continued

| | | | | | | | | | | | |
|---|---|---|---|---|---|---|---|---|---|---|---|
| | 25 | Excellent | Excellent | Poor | Poor | Poor | Excellent | Poor | Poor | Poor | Poor |
| | 30 | Excellent | Poor | Poor | Poor | Poor | Excellent | Poor | Poor | Poor | Poor |
| | 37 | Poor | Poor | Poor | Poor | Poor | Poor | Poor | Poor | Poor | Poor |

| Sample configuration | | | Evaluation | | | | | | | | |
|---|---|---|---|---|---|---|---|---|---|---|---|
| | Barrier layer formula | | | | | | | | | | |
| | Degree of saponification of PVA | Amount of MN | MGIS Elongation rate (%) | | | | | SMO Elongation rate (%) | | | |
| Support | % | wt % | 0 | 5 | 10 | 20 | 30 | 0 | 5 | 10 | 20 | 30 |
| Ethers 20 μm | 80 | 1 | None | None | None | None | None | Poor | Poor | Poor | Poor | Poor |
| | | 2 | Excellent | Excellent | Excellent | Excellent | Excellent | None | None | None | None | None |
| | | 10 | Excellent | Excellent | Excellent | Excellent | Excellent | Poor | Poor | Poor | Poor | Poor |
| | | 18 | None | None | None | None | None | Poor | Poor | Poor | Poor | Poor |
| | | 22 | Excellent | Excellent | Excellent | Excellent | Excellent | Poor | Poor | Poor | Poor | Poor |
| | | 25 | None | None | None | None | None | Poor | Poor | Poor | Poor | Poor |
| | | 30 | None | None | None | None | None | Poor | Poor | Poor | Poor | Poor |
| | | 37 | None | None | None | None | None | Poor | Poor | Poor | Poor | Poor |

Figure 10:
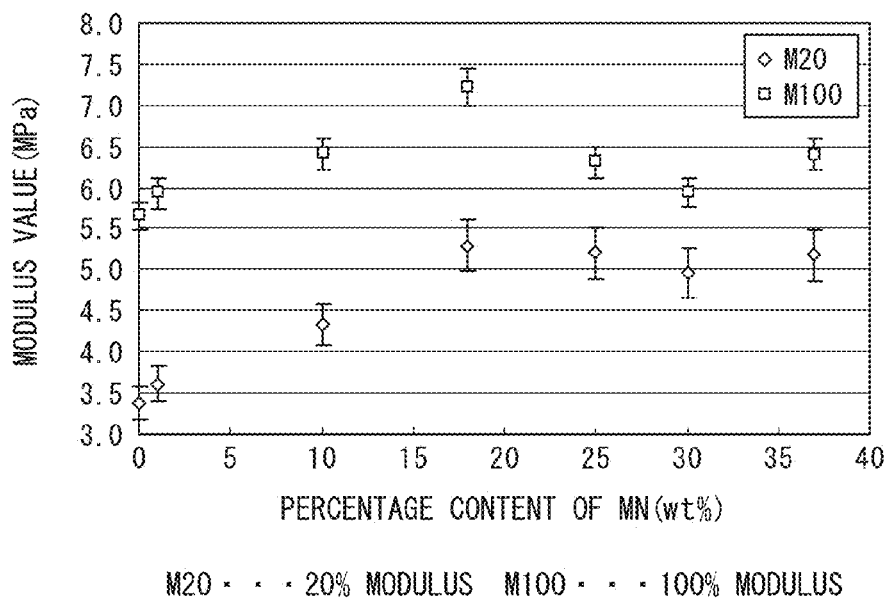
FIG. 10 is a graph showing a relationship between a percentage content of montmorillonite and a modulus value of a support film for tape.

In addition, in each sample, when evaluating modulus after the elongation operation based on a test method of a polyurethane-based thermoplastic elastomer (JIS K 7311), as shown in FIG. 10, the modulus was equal to or less than 8 Mega Pascals (MPa) for all samples, and excellent flexibility was shown. Accordingly, it was determined that the barrier layer did not negatively affect the flexibility of the support film.

(Experiment 2 Evaluation of Relationship Between Barrier Property of Support Film and Percentage Content of MN: Evaluation Using Adhesive Layer Containing Plasticizer)

(2-1 Preparation of Sample)

The same material as Experiment 1 was used as a support, and a barrier layer was formed by uniformly coating 1.0 g/m² of a barrier coating material which was obtained by mixing MN and PVA (with a degree of saponification of 80%) on one surface of the support. Nine stages of the percentage content of MN of the barrier layer were 1 wt %, 2 wt %, 4 wt %, 10 wt %, 18 wt %, 22 wt %, 25 wt %, 30 wt %, and 37 wt %, and 9 types of samples of support films were prepared.

In addition, an adhesive layer (applied amount of adhesive layer: 100 g/m²) including a base material and a plasticizer was formed on the barrier layer. Two types of rubber base material and an acrylic base material were used as the base material, and a total of 5 types of adhesive layer materials were prepared by combining each base material with a plurality of types of plasticizers. The adhesive layer was formed on each sample using each an adhesive layer material, and samples of tapes were prepared by covering the adhesive layer with a peel-off member. The combinations of the base material and the plasticizer for each adhesive layer material were as follows (% of the plasticizer indicates the percentage content). Rubber base material (IPM 20%, MGIS 10%, SMO 10%, and SMO 20%) and the acrylic base material (IPM 20%, TA 10%, MGIS 10%, and SMO10%).

(2-2 Experiment Procedure)

a. Stability Test for Non-Elongation

A tape sample obtained by cutting to 10 square centimeters was stored at 60° C. for 1 week without performing an elongation operation.

b. Stability Test for Elongation

A tape sample obtained by cutting to have a width of 30 mm and a length of 50 mm was stored at 60° C. for three days after removing the peel-off member and performing the elongation operation with an elongation rate of 20% in a length direction once.

In all cases, in each tape sample after storing, in the same manner as Experiment 1, the barrier properties of the support film was evaluated by the generation of wrinkles of the support. The evaluation of Experiment 2 was set as three stages. Wrinkles due to the swelling were not recognized: Excellent, slight wrinkles due to the swelling were recognized, but did not affect the quality: Good, and wrinkles due to the swelling were recognized and the support could not be used: Poor. In addition, a case where an experiment was not performed was stated as "None" in Table 2.

(2-3 Experiment Results)

The result is shown in Table 2. When the percentage content of the MN of the barrier layer is 2 wt %, 10 wt %, and 18 wt %, in any of the non-elongation time and the 20% elongation time, wrinkles were not recognized in the support and the barrier properties of the support film was excellently maintained.

In addition, for the SMO, which was considered to be not preferable sometimes in Experiment 1, it was determined that the transition of the plasticizers to the support can be sufficiently suppressed by suitably setting the percentage content of MN of the barrier layer or the percentage content of the plasticizers of the adhesive layer.

TABLE 2

| | Rubber based material | | | | | | | |
|---|---|---|---|---|---|---|---|---|
| | IPM 20% | | MGIS 10% | | SMO 10% | | SMO 20% | |
| Amount of MN (wt %) | Non-elongation | Elongation rate 20% | Non-elongation | Elongation rate 20% | Non-elongation | Elongation rate 20% | Non-elongation | Elongation rate 20% |
| 1 | Poor | Poor | Poor | Poor | Poor | Poor | Poor | Poor |
| 2 | Excellent | Excellent | Poor | Poor | Poor | Poor | None | None |

TABLE 2-continued

| | | | | | | | | |
|---|---|---|---|---|---|---|---|---|
| 4 | None | None | Good | Good | Poor | Poor | None | None |
| 10 | Excellent | Excellent | Excellent | Excellent | Good | Good | Poor | Poor |
| 18 | Excellent | Excellent | Excellent | Excellent | Excellent | Excellent | Poor | Poor |
| 22 | Excellent | Excellent | Excellent | Excellent | Excellent | Excellent | None | None |
| 25 | Poor | Poor | None | None | None | None | Poor | Poor |
| 30 | Poor | Poor | None | None | None | None | Poor | Poor |
| 37 | Poor | Poor | None | None | None | None | Poor | Poor |

| | Acrylic based material | | | | | | | |
|---|---|---|---|---|---|---|---|---|
| | IPM 20% | | TA 10% | | MGIS 10% | | SMO 10% | |
| Amount of MN (wt %) | Non-elongation | Elongation rate 20% | Non-elongation | Elongation rate 20% | Non-elongation | Elongation rate 20% | Non-elongation | Elongation rate 20% |
| 1 | Poor | Excellent | Poor | Poor | Poor | Poor | Poor | Poor |
| 2 | Excellent | Good | None | None | Poor | Poor | Poor | Poor |
| 4 | Excellent | Excellent | None | None | Good | Good | Poor | Poor |
| 10 | Excellent | Excellent | Poor | Poor | Excellent | Good | Good | Excellent |
| 18 | Excellent | Excellent | Good | Good | Excellent | Excellent | Excellent | Excellent |
| 22 | Excellent | Excellent | Excellent | Excellent | Excellent | Excellent | Excellent | Excellent |
| 25 | None | Poor | None | Good | None | None | None | Poor |
| 30 | Excellent | Poor | Excellent | Good | None | None | Excellent | Poor |
| 37 | Good | Poor | Excellent | Good | None | None | Excellent | Poor |

The results of Experiments 1 and 2 show that, if the percentage content of the MN of the barrier layer 12 is 2 to 22 wt %, barrier properties of the support film for sufficiently suppressing the transition of the plasticizer to the support can be secured in any of the non-elongation time of the support film and the 20% elongation time of the support film.

(Experiment 3 Evaluation of Relationship Between Degree of Saponification of PVA and Adhesiveness of Support-Barrier Layer in Support Film: Evaluation of Water Resistance Adhesion of Support Film)

(3-1 Preparation of Sample)

A support was prepared in the same manner as Experiment 1, and a degree of saponification of PVA to be used for a barrier layer was four stages of 80%, 90%, 95.5% and 98.5% (complete saponification). A barrier coating material was prepared by mixing the PVA of each degree of saponification and the MN, and was coated to form a barrier layer with the same amount and method as Experiment 1, and a sample 120 of the support film was prepared. The percentage content of the MN of the barrier layer was 10 wt %.

Figure 11:
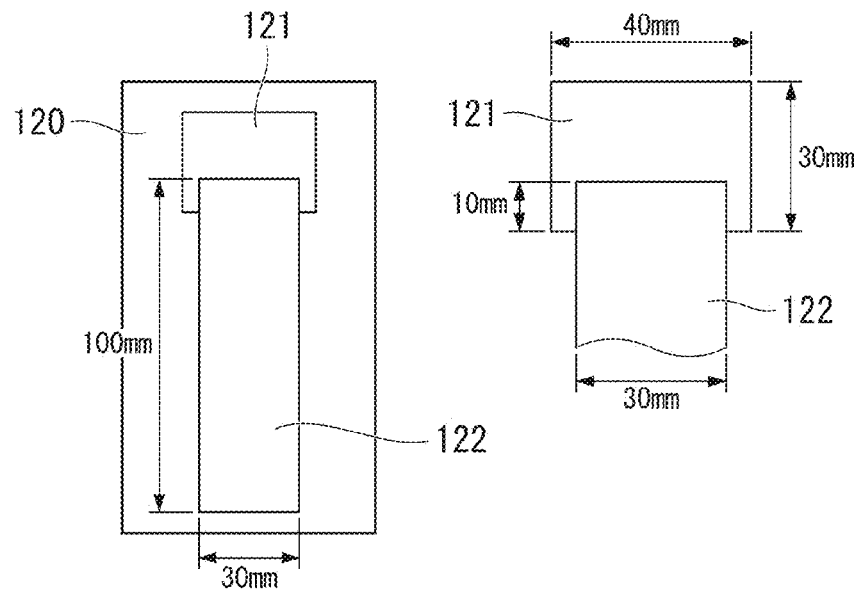
FIG. 11 is a view showing a procedure of an experiment for checking for a relationship between a degree of saponification of a water-soluble polymer compound and an adhesiveness of a support-barrier layer.
Figure 12:
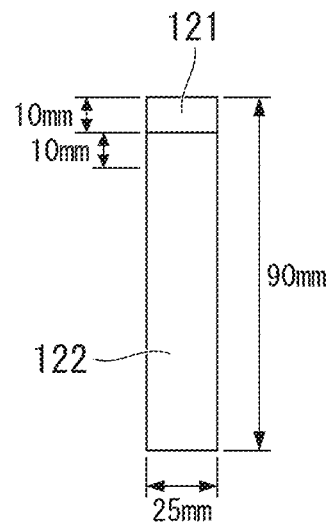
FIG. 12 is a view showing a procedure of the same experiment.
Figure 13:
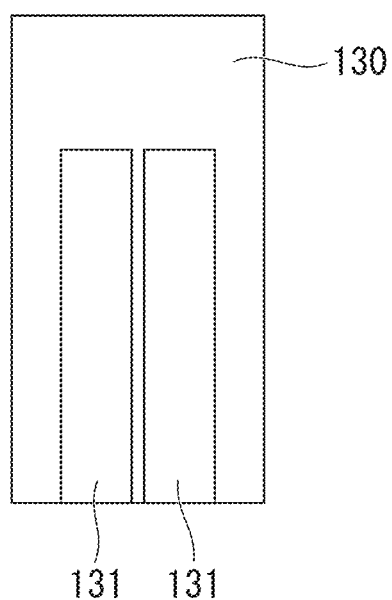
FIG. 13 is a view showing a procedure of the same experiment.
Figure 14:
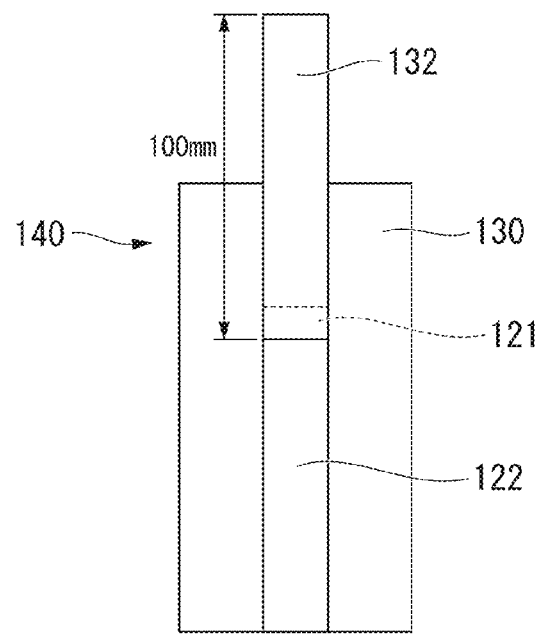
FIG. 14 is a view showing a procedure of the same experiment.
Figure 15:
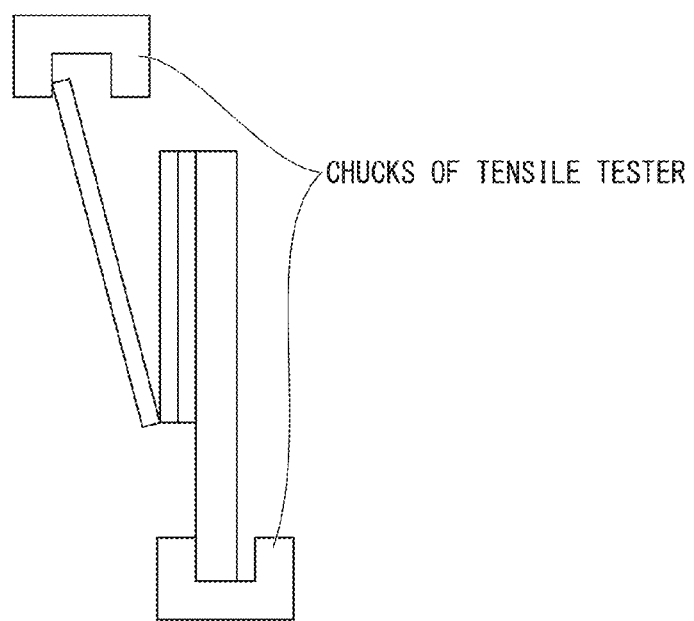
FIG. 15 is a view showing a procedure of the same experiment.

(3-2 Experiment Procedure)

a. An adhesive tape 122 was cut to be a size of 30 mm×100 mm. After attaching a PET sheet 121 on which silicone was applied to one end of the cut adhesive tape 122 in the longitudinal direction, the adhesive tape was attached to the barrier layer of the sample 120 as shown in FIG. 11.

b. The adhesive tape 122, the PET sheet 121 and the sample 120 were cut to have a size of 25 mm×90 mm as shown in FIG. 12.

c. As shown in FIG. 13, two double-sided tapes 131 having a size of 25 mm×90 mm were attached to be in parallel to each other to an acrylic plate 130. Further, the support side of the cut adhesive tape 122 was brought into contact with the double-sided tapes 131, and the cut adhesive tape 122 was adhered so as to cover two double-sided tapes 131 which were attached to the acrylic plate. Part of the double-sided tapes 131 which protruded from the adhesive tape 122 was cut off to remove from the acrylic plate 130.

d. A reinforcement tape 132 having a size of 50 mm×100 mm was prepared, and as shown in FIG. 14, the reinforcement tape 132 was attached to the end of the adhesive tape 122 which was not adhered to the sample 120 so as to interpose the PET sheet 121 in the thickness direction, to prepare an evaluation piece 140.

e. The evaluation piece 140 was dipped in water at 40° C. and left for 30 minutes. At that time, the entire adhesive tape 122 was positioned in the water.

f. The evaluation piece 140 was picked up from the water after 30 minutes had passed, and was set in the tensile tester after wiping off the moisture. At that time, as shown in FIG. 15, the acrylic plate 130 was fixed to one chuck, and an end which was not adhered to the PET sheet of the reinforcement tape 132 was fixed to another chuck.

g. The evaluation piece was pulled with a tension rate of 300 mm/min, and the measurement ended at the point of complete peel-off of the adhesive tape 122 from the support. An average value of tension values N of the tensile tester with a range of tension amount from 10 mm to 30 mm was set as a water resistance adhesion. Three evaluation pieces were prepared for a sample and the water resistance adhesion of the support film was evaluated.

(3-3 Experiment Results)

The result is shown in Table 3. With the evaluation piece having the degree of saponification of PVA of equal to or less than 95.5%, the average value of the tension values N was equal to or more than 10 Newtons (N) and excellent water resistance adhesion was shown. With the evaluation piece having the degree of saponification of 98.5%, the water resistance adhesion was significantly degraded.

TABLE 3

| Degree of saponification of PVA | Amount of MN (wt %) | Water resistance adhesion [N/25 mm width] | | |
|---|---|---|---|---|
| | | n = 1 | n = 2 | n = 3 |
| 80 | 10 | 13.5 | 13.1 | 17.2 |
| 90 | | 10.6 | 10.2 | 10.6 |
| 95.5 | | 14.1 | 13 | 13.5 |
| 98.5 | | 1.9 | 2.6 | 2.1 |

(Experiment 4 Evaluation of Relationship Between Undercoat Layer and Adhesiveness of Support-Barrier Layer in Support Film: Evaluation of Water Resistance Adhesion of Support Film)

(4-1 Preparation of Sample)

A urethane resin solution and an acrylic resin solution were prepared as a material of an undercoat layer. Further, 2 types of white ink which were combined with an white pigment in each of the urethane resin solution and the acrylic resin solution was prepared, and a total of 4 types of solutions thereby were prepared. In addition, as a material of a barrier layer, a total of 2 types of solutions were prepared by combining MN having a content of 10 wt % and PVA having a degree of saponification of 90% and 98.5%.

A support prepared by polyether-based polyurethane having a thickness of 20 μn was used as the support 11. The 2.0 g/m² of 4 types of undercoat layers were coated on one surface of the support 11 by a gravure coating method. A barrier layer was formed by uniformly coating the 2.2 g/m² of 2 types of barrier layer materials thereon by the gravure coating method respectively, and 8 types of samples were prepared.

In addition, a corona treatment was carried out on the support 11, and the support was coated with the 2.2 g/m² of 2 types of the barrier layer materials without the undercoat layer, and this sample was set to a comparative example.

(4-2 Experiment Procedure)

A. Adhesion Evaluation Method of Adhesive Tape

A urethane surface of the sample obtained by cutting to 10 cm×5 cm was attached to an acrylic plate with double-sided tape (770K, manufactured by Teraoka Seisakusho co., Ltd., width: 30 mm). Further, a cellophane tape (trade mark) (PB-TP1835-10, manufactured by KOKUYO Marketing Co., Ltd., width: 18 mm) having a length of 5 cm was attached to a barrier layer surface of the sample, the cellophane tape was peeled off by hand at once, and then the presence or absence of the release of the barrier layer was confirmed.

B. Evaluation of Water Resistance Adhesion

According to the water resistance adhesion, an evaluation was carried out, in the same procedure as Experiment 3.

(4-3 Result)

The result is shown in Table 4. As shown in the comparative example, if there was no undercoat layer on the support film and the degree of saponification of PVA of the barrier layer was high (98.5%), the adhesiveness with the support was not obtained, and the practical application thereof was not obtained. On the other hand, by forming the undercoat layer described above on the support film, it is possible to obtain a sufficient adhesiveness for practical use, regardless of the degree of saponification of PVA. In addition, the water resistance adhesion of the support film on which the undercoat layer was formed has a value of equal to or more than 5 N/25 mm, and it was considered that there is sufficient resistance even if the support film is used in a purpose to be touched with water, or in a bath in a state of being attached to the skin of a user. Further, even when the undercoat layer was formed on the support film using an ink containing a pigment, it was determined that the significant effect can be obtained.

TABLE 4

| | | | Sample configuration | | | | Evaluation of adhesion | | | |
|---|---|---|---|---|---|---|---|---|---|---|
| | | | | Undercoat layer | | Barrier layer formula | | Water resistance adhesion N/25 mm | | |
| | | Support | Corona treatment | Resin component | Presence of pigment | Degree of saponification % | Amount of MN wt % | Adhesion of cellophane tape | n = 1 | n = 2 | n = 3 |
| Example | Ethers 20 μm | Not performed | Urethane resin | No | 90 | 10 | Excellent | 11.5 | 7.5 | 8.0 |
| | | | | | 98.5 | | Excellent | 10.4 | 7.8 | 9.5 |
| | | | | Yes | 90 | 10 | Excellent | 10.4 | 9.1 | 10.9 |
| | | | | | 98.5 | | Excellent | 10.2 | 7.0 | 8.1 |
| | | Not performed | Acrylic resin | No | 90 | 10 | Excellent | 8.5 | 8.6 | 8.8 |
| | | | | | 98.5 | | Excellent | 9.5 | 7.6 | 8.8 |
| | | | | Yes | 90 | 10 | Excellent | 7.5 | 6.8 | 7.8 |
| | | | | | 98.5 | | Excellent | 7.4 | 6.3 | 6.9 |
| Comparative Example | Ethers 20 μm | Performed | None | No | 90 | 10 | Excellent | 11.0 | 11.3 | 10.6 |
| | | | | | 98.5 | | Poor | 1.5 | 2.1 | 1.3 |

(Experiment 5 Evaluation of Relationship Between Barrier Property and Undercoat Layer at the Time of Elongation of Support Film: Evaluation with Swelling of Support as Index)

(5-1 Preparation of Sample)

8 types of samples were prepared by combining 4 types of undercoat layer materials and 2 type of barrier layer material, in the same manner as Experiment 4. In addition, 2 type of comparative examples on which an undercoat layer was not formed on the support film (without undercoat layer) were prepared, in the same manner as Experiment 4.

(5-2 Experiment Procedure)

An experiment for the prepared total of 10 types of samples was carried out, in the same procedure as Experiment 1.

(5-3 Result)

The result is shown in Table 5. In the support film using a urethane resin for the undercoat layer, when using the IPM, TA, and MGIS, the swelling of the all support with elongation rates at the time of elongation with the elongation rate of the support film of 30% was not recognized, and transition of the plasticizers to the support was suppressed. Accordingly, when the urethane resin was used in the undercoat layer by using the plasticizers, a significant elongation is applied and thus, was sufficient to meet the purpose. On the other hand, with the SMO, the swelling of the support was recognized regardless of the elongation rates, and it was considered that the SMO is not preferable as the plasticizer to be used for a tape of the present invention, in some cases.

In addition, in the support film using an acrylic resin for the undercoat layer, when using the IPM, TA, and MGIS, the swelling of the support which was elongated by 10% elongation rate of the support film was not recognized, and transition of the plasticizers was suppressed. In the support film using an acrylic resin for the undercoat layer, it was assumed that the elongation of the film is poor relative to the support film using the urethane resin for the undercoat layer and cracks are generated on the barrier layer. However, it was considered that the support film can be used for various purposes without any problems practically as long as it is elongated by 10% of elongation rate. On the other hand, with the SMO, the swelling of the support was recognized regardless of the elongation rates of the support film, and it was considered that the SMO is not preferable as the plasticizer to be used for a tape of the present invention, in some cases.

TABLE 5

| | | Sample Configuration | | | | Evaluation of barrier properties of plasticizer | | | | |
|---|---|---|---|---|---|---|---|---|---|---|
| | | Undercoat layer | | Barrier layer formula | | IPM Elongation rate (%) | | | | |
| | Support | Corona treatment | Resin component | Presence of pigment | Degree of saponification of PVA % | Amount of MN wt % | 0 | 5 | 10 | 20 | 30 |
| Example | Ethers 20 μm | Not performed | Urethane resin | No | 90 98.5 | 10 | Excellent Excellent | Excellent Excellent | Excellent Excellent | Excellent Excellent | Excellent Excellent |
| | | | | Yes | 90 98.5 | 10 | Excellent Excellent | Excellent Excellent | Excellent Excellent | Excellent Excellent | Excellent Excellent |
| | | Not performed | Acrylic resin | No | 90 98.5 | 10 | Excellent Excellent | Excellent Excellent | Excellent Excellent | Poor Poor | Poor Poor |
| | | | | Yes | 90 98.5 | 10 | Excellent Excellent | Excellent Excellent | Excellent Excellent | Poor Poor | Poor Poor |
| Comparative Example | Ethers 20 μm | Performed | None | No | 90 98.5 | 10 | Excellent Excellent | Excellent Excellent | Excellent Excellent | Excellent Excellent | Excellent Poor |

| | | Sample Configuration | | | | Evaluation of barrier properties of plasticizer | | | | |
|---|---|---|---|---|---|---|---|---|---|---|
| | | Undercoat layer | | Barrier layer formula | | TA Elongation rate (%) | | | | |
| | Support | Corona treatment | Resin component | Presence of pigment | Degree of saponification of PVA % | Amount of MN wt % | 0 | 5 | 10 | 20 | 30 |
| Example | Ethers 20 μm | Not performed | Urethane resin | No | 90 98.5 | 10 | Excellent Excellent | Excellent Excellent | Excellent Excellent | Excellent Excellent | Excellent Excellent |
| | | | | Yes | 90 98.5 | 10 | Excellent Excellent | Excellent Excellent | Excellent Excellent | Excellent Excellent | Excellent Excellent |
| | | Not performed | Acrylic resin | No | 90 98.5 | 10 | Excellent Excellent | Excellent Excellent | Excellent Excellent | Poor Poor | Poor Poor |
| | | | | Yes | 90 98.5 | 10 | Excellent Excellent | Excellent Excellent | Excellent Excellent | Poor Poor | Poor Poor |
| Comparative Example | Ethers 20 μm | Performed | None | No | 90 98.5 | 10 | Excellent Excellent | Excellent Excellent | Excellent Excellent | Excellent Excellent | Excellent Poor |

| | | Sample Configuration | | | | Evaluation of barrier properties of plasticizer | | | | |
|---|---|---|---|---|---|---|---|---|---|---|
| | | Undercoat layer | | Barrier layer formula | | MGIS Elongation rate (%) | | | | |
| | Support | Corona treatment | Resin component | Presence of pigment | Degree of saponification of PVA % | Amount of MN wt % | 0 | 5 | 10 | 20 | 30 |
| Example | Ethers 20 μm | Not performed | Urethane resin | No | 90 98.5 | 10 | Excellent Excellent | Excellent Excellent | Excellent Excellent | Excellent Excellent | Excellent Excellent |
| | | | | Yes | 90 98.5 | 10 | Excellent Excellent | Excellent Excellent | Excellent Excellent | Excellent Excellent | Excellent Excellent |
| | | Not performed | Acrylic resin | No | 90 98.5 | 10 | Excellent Excellent | Excellent Excellent | Excellent Excellent | Poor Poor | Poor Poor |
| | | | | Yes | 90 98.5 | 10 | Excellent Excellent | Excellent Excellent | Excellent Excellent | Poor Poor | Poor Poor |
| Comparative Example | Ethers 20 μm | Performed | None | No | 90 98.5 | 10 | Excellent Excellent | Excellent Excellent | Excellent Excellent | Excellent Excellent | Excellent Poor |

| | | Sample Configuration | | | | Evaluation of barrier properties of plasticizer | | | | |
|---|---|---|---|---|---|---|---|---|---|---|
| | | Undercoat layer | | Barrier layer formula | | SMO Elongation rate (%) | | | | |
| | Support | Corona treatment | Resin component | Presence of pigment | Degree of saponification of PVA % | Amount of MN wt % | 0 | 5 | 10 | 20 | 30 |
| Example | Ethers 20 μm | Not performed | Urethane resin | No | 90 98.5 | 10 | Poor Poor | Poor Poor | Poor Poor | Poor Poor | Poor Poor |
| | | | | Yes | 90 98.5 | 10 | Poor Poor | Poor Poor | Poor Poor | Poor Poor | Poor Poor |

TABLE 5-continued

|  |  |  |  |  |  |  |  |  |  |  |  |
|---|---|---|---|---|---|---|---|---|---|---|---|
|  |  | Not performed | Acrylic resin | No | 90 | 10 | Poor | Poor | Poor | Poor | Poor |
|  |  |  |  |  | 98.5 |  | Poor | Poor | Poor | Poor | Poor |
|  |  |  |  | Yes | 90 | 10 | Poor | Poor | Poor | Poor | Poor |
|  |  |  |  |  | 98.5 |  | Poor | Poor | Poor | Poor | Poor |
| Comparative Example | Ethers 20 μm | Performed | Poor | No | 90 | 10 | Poor | Poor | Poor | Poor | Poor |
|  |  |  |  |  | 98.5 |  | Poor | Poor | Poor | Poor | Poor |

As described above, in the support film of the present invention, by setting the percentage content of MN of the barrier layer to be 2 to 22 wt %, it is possible to suitably maintain the barrier properties even with elongation to an elongation rate of the support film of 20%. As a result, in any case of the non-elongation time of the tape and the elongation of the tape to an elongation rate of 20%, it is possible to suitably maintain barrier properties and to form a tape which suitably prevents transition of plasticizers of an adhesive layer to a support.

In addition, by providing the undercoat layer on the support film and the tape, the adhesiveness between the support and the barrier layer is improved, so that, it is possible to configure a support film and a tape which having an excellent water resistance adhesion. In this case, the degree of saponification of PVA was preferably 70 to 98.5%, and among the complete saponification PVA, PVA having a degree of saponification exceeds 98.5% can also be used. The PVA having a degree of saponification equal to or more than 95.5% has excellent barrier properties but has insufficient water resistance and the adhesiveness with urethane, in some cases. However, by providing the undercoat layer to the support film and the tape, it is possible to use such PVA, and to configure a support film and a tape which can resist multiple use conditions.

As described above, the embodiment of the present invention has been described; however, the technique range of the present invention is not limited to the embodiment described above, and it is possible to change combinations of constituent elements of each embodiment, to add and remove various modifications to and from each constituent element in a range not departing from the purpose of the present invention.

For example, it is not essential to set the degree of saponification of PVA to the range described above in the support film and the tape of the present invention. Accordingly, PVA having a value of a degree of saponification out of the range described above or other water-soluble polymers may be used for the barrier layer in a case where the usage environment of a tape is not that harsh. The present invention can be widely used for a tape for various purposes such as for medicine, industrial applications and the like.

What is claimed is:

1. A support film for tape which is used for a tape, comprising:
    a film-shaped support formed of polyurethane;
    a barrier layer which includes polyvinyl alcohol and a layered inorganic compound and is formed on a surface of the support; and
    an undercoat layer which is disposed between the support and the barrier layer, and which causes the support and the barrier layer to adhere to each other, the undercoat layer being formed of a water-soluble resin, the water-soluble resin being one or more compounds selected from the group consisting of an acrylic resin, polyurethane resins, polyester resins, vinyl acetate resins, styrene resins, shellac resins, polyamide resins, and a modified product thereof.

2. The support film for tape according to claim 1, wherein a degree of saponification of the polyvinyl alcohol is in a range of equal to or more than 70%.

3. The support film for tape according to claim 1, wherein the layered inorganic compound is montmorillonite.

4. The support film for tape according to claim 1, wherein a printing is carried out on the undercoat layer.

5. A tape comprising:
    the support film for tape according to claim 1; and
    an adhesive layer being formed on the barrier layer, the adhesive layer being formed on a face opposite to the support.

6. The support film for tape according to claim 1, Wherein a coating amount of the water-soluble resin on the film-shaped support is 0.1 to 10 g/m$^2$.

* * * * *